(12) United States Patent
Xu et al.

(10) Patent No.: US 12,028,951 B2
(45) Date of Patent: Jul. 2, 2024

(54) CAMERA BASED ADAPTIVE BRIGHTNESS BACKUP LIGHT SYSTEM

(71) Applicant: GM Global Technology Operations LLC, Detroit, MI (US)

(72) Inventors: An Xu, Shanghai (CN); Xinliang Zhang, Shanghai (CN); Li Shen, Shanghai (CN); Jieping Wang, Shanghai (CN); Zhijun Wang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 335 days.

(21) Appl. No.: 17/466,141

(22) Filed: Sep. 3, 2021

(65) Prior Publication Data
US 2023/0073997 A1   Mar. 9, 2023

(51) Int. Cl.
*H05B 47/11* (2020.01)
*B60Q 1/00* (2006.01)
*B60Q 1/22* (2006.01)

(52) U.S. Cl.
CPC ........... *H05B 47/11* (2020.01); *B60Q 1/0035* (2013.01); *B60Q 1/22* (2013.01); *B60Q 2300/054* (2013.01); *B60Q 2300/144* (2013.01); *B60Q 2300/314* (2013.01)

(58) Field of Classification Search
CPC ............ B60Q 2300/41; B60Q 2300/42; B60Q 2300/312; B60Q 2300/3321; B60Q 2300/054
See application file for complete search history.

(56) References Cited

U.S. PATENT DOCUMENTS

| | | | |
|---|---|---|---|
| 2012/0116632 A1* | 5/2012 | Bechtel ................ | G06V 10/147 701/1 |
| 2015/0092047 A1* | 4/2015 | Ryu .......................... | B60R 1/27 348/135 |
| 2015/0172527 A1* | 6/2015 | McElroy ................ | H04N 23/74 348/148 |
| 2020/0114812 A1* | 4/2020 | Imaishi ................... | B60Q 1/346 |
| 2020/0164814 A1* | 5/2020 | Solar ....................... | G06V 20/56 |
| 2021/0031676 A1* | 2/2021 | Park ........................ | B60K 35/22 |

* cited by examiner

*Primary Examiner* — Wei (Victor) Y Chan
(74) *Attorney, Agent, or Firm* — Vivacqua Crane, PLLC

(57) ABSTRACT

A method for modifying a brightness level of an automobile vehicle backup light includes: receiving electronic signals in a brightness evaluator and light controller defining at least one image captured within a field-of-view (FOV) of an automobile vehicle camera; dividing the at least one image into multiple independent zones; evaluating an environmental brightness level of individual ones of the multiple independent zones; comparing a brightness level of at least one backup light of the automobile vehicle to the environmental brightness level; and sending a control signal to the at least one backup light to modify the brightness level of the least one backup light.

10 Claims, 4 Drawing Sheets

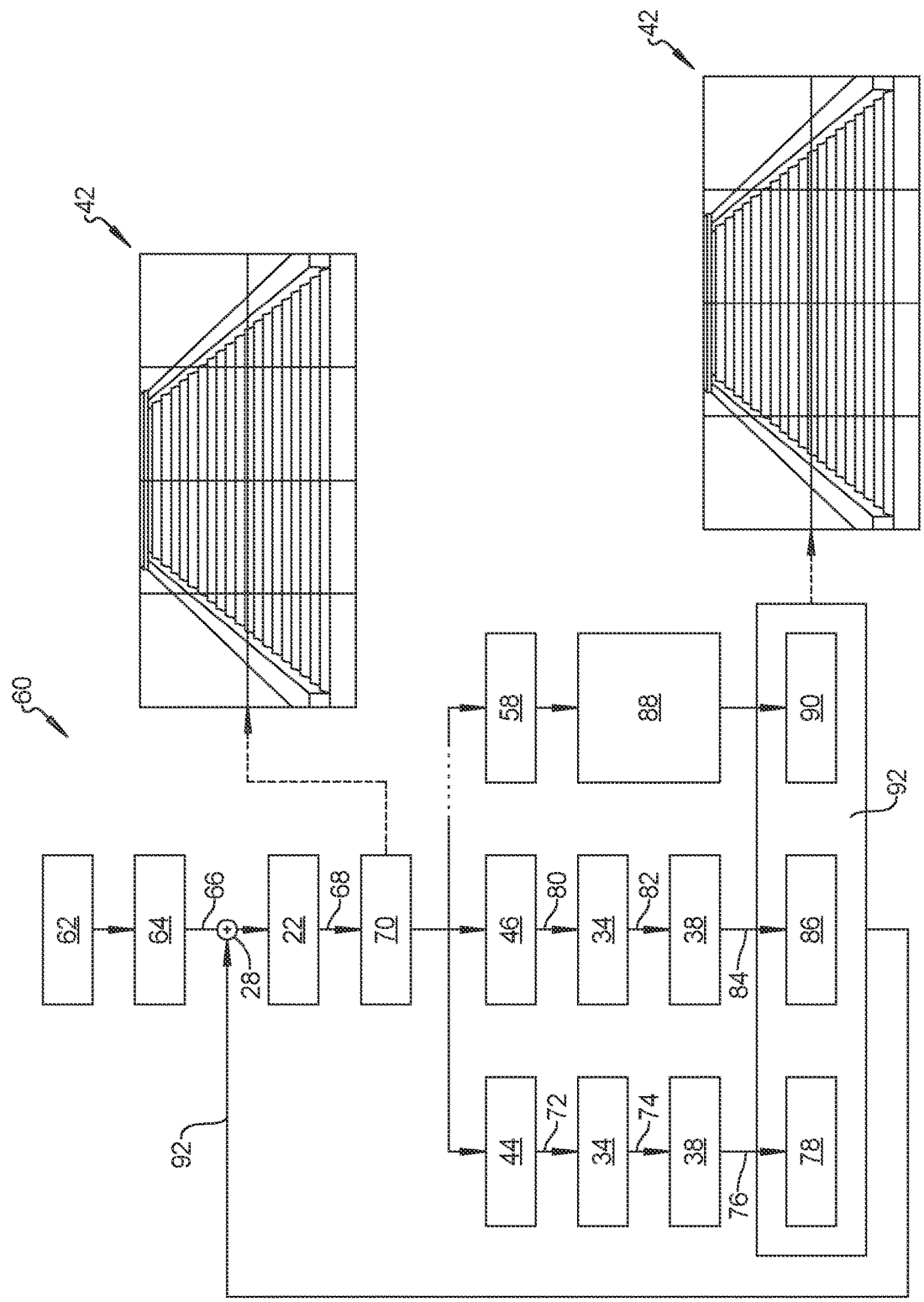

CAMERA BASED ADAPTIVE BRIGHTNESS BACKUP LIGHT SYSTEM

INTRODUCTION

The present disclosure relates to automobile vehicle backup light systems.

In automobile vehicles equipped with rear camera systems, bad image quality of the rear camera may be caused by low light conditions. This may occur in a mechanical parking spot situation in which brightness is low. This may also occur in situations when a reflective material may cause backup light reflection toward the camera which reduces camera image quality.

A traditional or known solution to improve camera image quality provides two systems to improve image quality in complex brightness conditions. The first system uses a light sensor to evaluate environmental brightness, however the light sensor only reposts a highest brightness and can be affected by a light source outside of the camera's vision. The second system employs a large complementary metal-oxide semiconductor (CMOS) with a high sensitivity camera having a fixed brightness lamp. This combination of equipment results in a large camera size, high cost, a high noise in the image and unacceptable delay.

Thus, while current automobile vehicle rear camera systems achieve their intended purpose, there is a need for a new and improved camera based adaptive backup light system.

SUMMARY

According to several aspects, a method for modifying a brightness level of an automobile vehicle backup light incudes: receiving electronic signals in a brightness evaluator and light controller defining at least one image captured within a field-of-view (FOV) of an automobile vehicle camera; dividing the at least one image into multiple independent zones; evaluating an environmental brightness level of individual ones of the multiple independent zones; comparing a brightness level of at least one backup light of the automobile vehicle to the environmental brightness level; and sending a control signal to the at least one backup light to modify the brightness level of the least one backup light.

In another aspect of the present disclosure, the method further includes energizing the at least one backup light only when the automobile vehicle is in a reverse drive mode.

In another aspect of the present disclosure, the method further includes independently modifying the brightness level of one of the multiple zones illuminating rearward of the automobile vehicle.

In another aspect of the present disclosure, the method further includes separating the at least one backup light into a first backup light and a second backup light and mounting the first backup light and the second backup light on a rear facing portion of the automobile vehicle.

In another aspect of the present disclosure, the method further includes providing multiple illumination portions of the at least one backup light having each of the multiple illumination portions independently illuminating one of the multiple independent zones.

In another aspect of the present disclosure, the method further includes independently modifying the brightness level of the one of the multiple independent zones.

In another aspect of the present disclosure, the method further includes: initially energizing the backup lights to a default brightness; forwarding brightness data $\bar{L}$ defining an average of the brightness levels of the at least one backup light to a comparator; and performing a judgment in the comparator to identify if the average of the brightness levels of the at least one backup light of the individual zones received by the camera is too bright, too dark or should be retained as being acceptable and modified if required by altering the predetermined default brightness of the backup lights.

In another aspect of the present disclosure, the method further includes sending the control signal to the at least one backup light to modify the brightness level of one of the individual ones of the multiple independent zones.

In another aspect of the present disclosure, the method further includes continuing to modify the brightness level of the least one backup light until the system is deactivated.

In another aspect of the present disclosure, the method further includes evaluating an environmental brightness level based on a Brightness Histogram.

According to several aspects, a method for modifying a brightness level of an automobile vehicle backup light includes: positioning the automobile vehicle in a reverse operating mode and energizing a first backup light and a second backup light; setting a brightness of the first backup light and a second backup light to a predetermined default brightness; emitting an illuminating energy from the energized first backup light and the second backup light to illuminate an environment; operating a camera to receive the illuminating energy and to generate image data; separating the image data using an image partitioner into multiple zones; and changing a brightness of the multiple zones by varying a signal to the first backup light and the second backup light.

In another aspect of the present disclosure, the method further includes: collecting a brightness value L for individual frame images of each of the multiple zones; storing individual values of L in a memory for a predetermined time length; and calculating an average of all the brightness values L stored in the memory based on a Brightness Histogram.

In another aspect of the present disclosure, the method further includes sending out the average of all the brightness values L as a Brightness Data $\bar{L}$ to a brightness evaluator.

In another aspect of the present disclosure, the method further includes: conducting an individual brightness evaluation for each of the multiple zones to yield a brightness data set from the individual zones; and forwarding the brightness data set to a light controller.

In another aspect of the present disclosure, the method further includes generating an individualized control signal by the light controller for individual ones of the zones, the control signal either retaining, increasing or decreasing a brightness of a backup light portion.

In another aspect of the present disclosure, the method further includes setting the individual brightness values L equal to a frame rate multiple of the predetermined time length.

In another aspect of the present disclosure, the method further includes deleting the individual values of L from the memory after the predetermined time length expires.

According to several aspects, a system for modifying a brightness level of an automobile vehicle backup light includes: an automobile vehicle camera having a field-of-view (FOV); a brightness control device receiving electronic signals defining at least one image captured within the field-of-view (FOV) of the automobile vehicle camera; and the at least one image being divided into multiple independent zones; an evaluator evaluating an environmental brightness level of individual ones of the multiple independent zones; a comparator comparing a brightness level of at least one backup light of the automobile vehicle to the environmental brightness level; and a light controller sending a control signal to the at least one backup light to modify the brightness level of the least one backup light.

In another aspect of the present disclosure, the at least one backup light defines a first backup light and a second backup light individually further including multiple backup light portions individually controlled by the control signal permitting each of the multiple backup light portions to control a brightness level of one of the multiple independent zones.

In another aspect of the present disclosure, the multiple backup light portions define a light emitting diode or a bulb.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a flow diagram presenting method steps for operation of the system of FIG. 1;

DETAILED DESCRIPTION

The following description is merely exemplary in nature and is not intended to limit the present disclosure, application, or uses.

Figure 1:
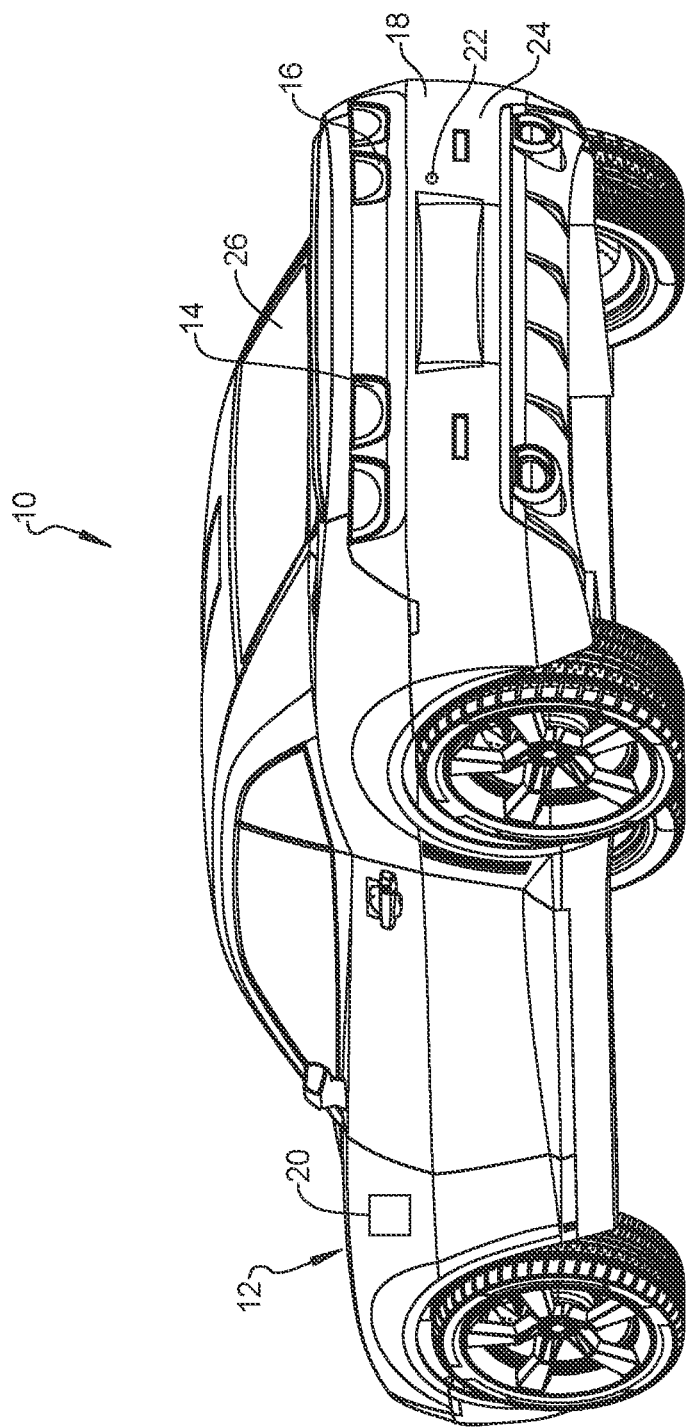
FIG. 1 is a rear left perspective view looking forward of an automobile vehicle having a camera based adaptive brightness backup light system according to an exemplary aspect.

Referring to FIG. 1, a camera based adaptive brightness backup light system 10 is provided for an automobile vehicle 12. The camera based adaptive brightness backup light system 10 includes at least one and according to several aspects a first backup light 14 and a second backup light 16 located horizontally opposite to each other at a rear panel 18 of the automobile vehicle 12. The camera based adaptive brightness backup light system 10 includes a brightness evaluator and light controller 20 having a brightness evaluator 34 and a light controller 38 described in greater detail below. The brightness evaluator and light controller 20 includes a computer adapted to receive input and output instructions and a memory. According to several aspects the camera based adaptive brightness backup light system 10 further includes a camera 22 which may be mounted externally on a rear bumper 24 of the automobile vehicle 12 and facing rearward or may be located within a rear passenger compartment 26 of the automobile vehicle 12 and facing rearward. Images captured within a field-of-view (FOV) of the camera 22 when the first backup light 14 and the second backup light 16 are energized are converted to electronic signals which are relayed to the brightness evaluator and light controller 20.

Referring to FIG. 2 and again to FIG. 1, the camera based adaptive brightness backup light system 10 functions as follows. An environment 28 reflects ambient or environmental light 30 which is received by the camera 22. It is noted the environment 28 may be an individual object such as another vehicle or a parking meter or may be an area including but not limited to a lined-off parking space, a roadside area or the like. The camera 22 generates image data 32 representing an image of the environment 28 which is forwarded to the brightness evaluator and light controller 20. The brightness evaluator and light controller 20 includes a brightness evaluator 34 which evaluates a brightness level of the image represented by the image data 32 using a brightness histogram. The brightness evaluator 34 generates brightness data 36 which is forwarded to a light controller 38. The light controller 38 uses the brightness data 36 and identifies if the brightness level of the image represented by the image data 32 meets or exceeds a predetermined threshold. If the predetermined threshold is not met or exceeded, the light controller 38 generates a control signal 40 which is forwarded to the first backup light 14 and the second backup light 16 to increase or decrease an intensity of the light generated by the first backup light 14 and the second backup light 16 to increase or enhance the environmental light 30.

Figure 2:
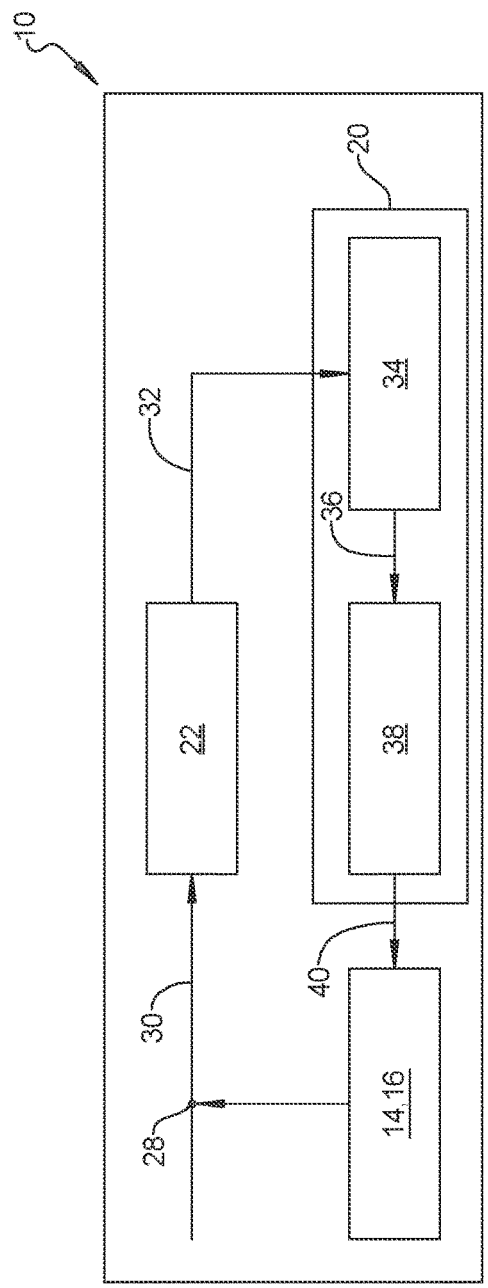
FIG. 2 is a flow diagram identifying components for operation of the system of FIG. 1.

Referring to FIG. 3 and again to FIGS. 1 and 2, the camera 22 may divide a camera field-of-view 42 into multiple zones. In the present example eight zones are presented including a first zone 44, a second zone 46, a third zone 48, a fourth zone 50, a fifth zone 52, a sixth zone 54, a seventh zone 56 and an eighth zone 58. According to several aspects any one or all of the eight zones of the camera field-of-view 42 may be individually or collectively enhanced using the control signal 40 generated by the light controller 38. To accomplish this the backup light which may include the first backup light 14 and the second backup light 16 may include individual light members such as individual light emitting diodes (LEDs) or similar features to allow a brightness of each of the multiple zones to be evaluated, increased or decreased. This is explained in greater detail in reference to FIG. 4.

Figure 3:
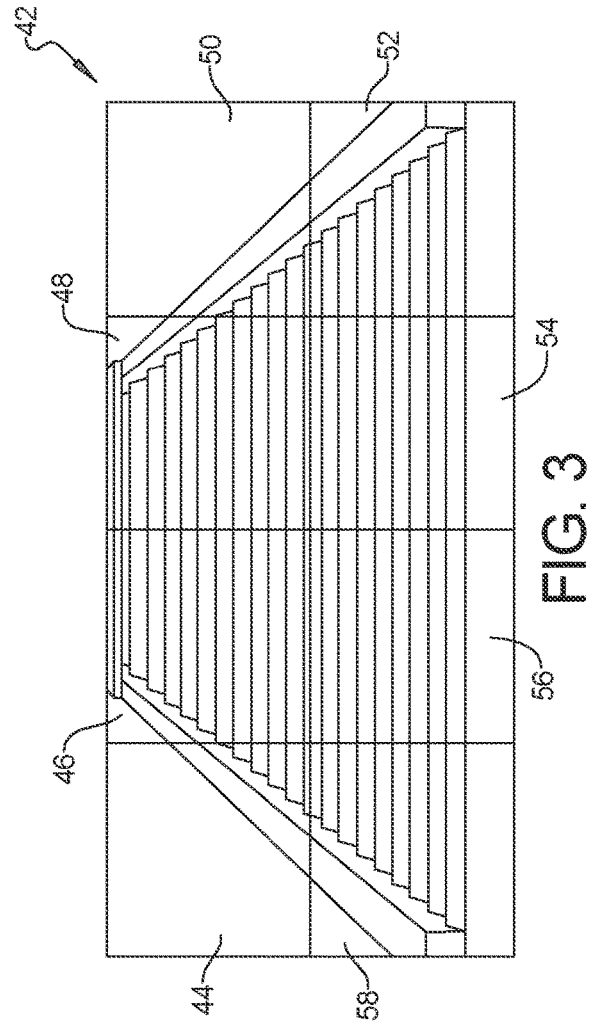
FIG. 3 is an exemplary camera field-of-view divided into eight zones according to an exemplary aspect.

Referring to FIG. 4 and again to FIGS. 1 through 3, a camera based adaptive brightness backup light method of operation 60 is used in tandem with the camera based adaptive brightness backup light system 10 to allow individual brightness control of one or more of the individual zones of the camera field-of-view 42. In an initializing step 62 the system is enabled which occurs when the automobile vehicle 12 is positioned in a reverse operating mode and the first backup light 14 and the second backup light 16 are energized. In a default step 64 a brightness of the backup lights are set to a predetermined default brightness. The energized backup lights such as the first backup light 14 and the second backup light 16 emit an illuminating energy 66 to illuminate the environment 28. The camera 22 generates image data 68 which is separated using an image partitioner 70 into multiple zones such as the exemplary first zone 44, second zone 46, and up to the exemplary eighth zone 58 described in reference to FIG. 3.

Image data from each of the zones such as for example image data 72 from the first zone 44 is sent to either a single brightness evaluator such as the brightness evaluator 34 or according to additional aspects to an independent brightness evaluator assigned to each of the zones. An individual brightness evaluation is then performed for each of the multiple zones which yields for example a brightness data set 74 from the first zone 44, which is forwarded to the light controller 38. An individualized control signal 76 is then generated by the light controller 38 for the first zone 44 and similarly for the other zones. The control signal 76 either retains, increases or decreases a brightness of a first backup light portion 78, which may be for example an individual LED of both the first backup light 14 and the second backup light 16 assigned to illuminate the first zone 44.

In parallel, image data from the second zone 46 is sent to either a single brightness evaluator such as the brightness evaluator 34 or to an independent brightness evaluator assigned to the second zone 46. An individual brightness evaluation is then performed for the second zone 46 which yields for example a brightness data set 82 from the first zone 44, which is forwarded to the light controller 38. An individualized control signal 84 is then generated by the light controller 38 for the second zone 46. The control signal 84 either retains, increases or decreases a brightness of a second backup light portion 86, which may be for example an individual LED of both the first backup light 14 and the second backup light 16 assigned to illuminate the second zone 46.

Control signals are also generated for remaining backup light portions assigned to each of the zones of the camera field-of-view 42 which are summarized as functions 88. For example, also in parallel, image data from the final or the exemplary eighth zone 58 is sent to either a single brightness evaluator such as the brightness evaluator 34 or to an independent brightness evaluator assigned to the eighth zone 58. An individual brightness evaluation is then performed for the eighth zone 58 which yields for example a brightness data set from the eighth zone 58, which is forwarded to the light controller 38. An individualized control signal is then generated by the light controller 38 for the eighth zone 58. The control signal for the eighth zone 58 either retains, increases or decreases a brightness of an eighth backup light portion 90, which may be for example an individual LED of both the first backup light 14 and the second backup light 16 assigned to illuminate the eighth zone 58. All of the backup light portions such as the first backup light portion 78, the second backup light portion 86, and up to the eighth backup light portion 90 are provided in a backup light module 92.

Referring to FIG. 5 and again to FIGS. 1 through 4, brightness evaluations conducted for example by the brightness evaluator 34 are performed as follows. Given the brightness value for each frame image of each zone, such as the exemplary brightness data set 74 an average brightness value L such as a first average brightness value 94 is calculated based on a Brightness Histogram. It is noted the value L for each brightness value is a dimensionless value representing a brightness level in image processing, ranging from 0 to 255. Each value of L is stored in a memory 96 positioned for example in the brightness evaluator and light controller 20 for a predetermined time length, $T_{ms}$. It is noted $T_{ms}$ is a changeable parameter that can be set according to needs. In a present exemplary aspect, $T_{ms}$ is set as 1 second.

After the time length $T_{ms}$ expires, the average brightness value L is deleted from the memory 96. It is noted individual brightness values L stored are equal to a frame rate multiple of $T_{ms}$. An average value 98 of all the brightness values stored in the memory 96 is calculated and sent out as a Brightness Data $\overline{L}$ for a changeable parameter $T_{bd}$. It is noted $T_{bd}$ is a changeable parameter that can be set according to need. In an exemplary aspect $T_{bd}$ is set such that $T_{bd}=T_{ms}=1$ second.

Figure 6:
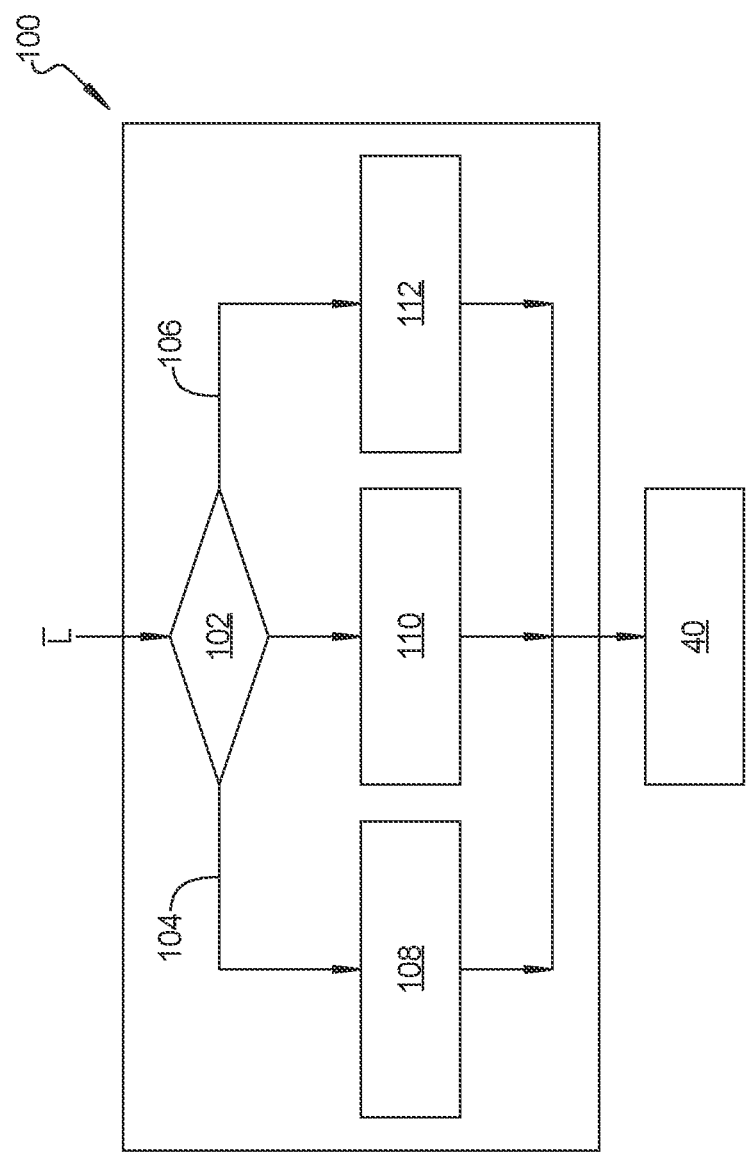
FIG. 6 is a flow diagram defining decision steps to decrease, retain or increase brightness of a backup light of the system of FIG. 1.
Figure 5:
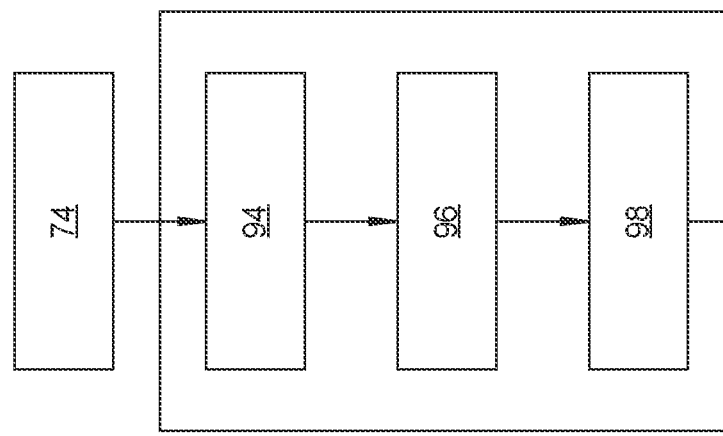
FIG. 5 is a flow diagram identifying steps for conducing brightness evaluations for the system of FIG. 1.

Referring to FIG. 6 and again to FIGS. 1 through 5, in a decision step 100 the brightness data $\overline{L}$ identified above with respect to FIG. 5 is received in a comparator 102 where a judgment is made to identify if the average brightness of the individual zones received by the camera 22 is too bright, too dark or should be retained as being acceptable and modified if required by altering the predetermined default brightness of the backup lights. A lower limit 104 and an upper limit 106 used for judgement are $L_{lower}$ and $L_{upper}$. It is noted $L_{lower}$ and $L_{upper}$ are dimensionless values based on a brightness histogram and are changeable parameters that can be set according to needs. According to several aspects, $L_{lower}$ and $L_{upper}$ are set as 110 and 150 respectively.

A lamp brightness of the first backup light 14 and the second backup light 16 may be retained, increased or decreased by keeping, increasing or decreasing a lamp voltage of the first backup light 14 and the second backup light 16, or by retaining a status, turning on or turning off individual lamp beads or light elements such as LEDs of the first backup light 14 and the second backup light 16. The control signal 40 to maintain or to make any change to lamp brightness is sent out every $T_{bd}$. The entire process is cycled until the system is deactivated.

A camera based adaptive brightness backup light system and method of the present disclosure may be adapted for use in any automobile vehicle. This may include but is not limited to sedans, sport utility vehicles, trucks including light duty and heavy-duty pickup trucks, vans, electrically operated vehicles, autonomously operated vehicles and the like. A single rear facing camera or multiple rear-facing cameras may be used. A single backup light or multiple backup lights may be used.

A camera based adaptive brightness backup light system and method of the present disclosure offers several advantages. These include a system and method that provides adaptive brightness intensity based on the brightness level of the rear camera field of view. The present system and method evaluate a real-time camera image to identify a brightness level and, based on the brightness level, control a backup light brightness intensity to illuminate the camera field-of-view. The present system and method evaluate image brightness in the camera's vision and excludes interference outside of the camera's vision. The present system and method can also be designed for zone dimming, which divides the camera vision field-of-view into several independent zones and adjusts a brightness of the corresponding zones independently. This mitigates against the effects of a locally high brightness or a locally low brightness.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for modifying a brightness level of at least one backup light in vehicle, the method comprising:
   energizing the at least one backup light to a default brightness to illuminate an environment rearward of the vehicle, wherein the at least one backup light includes multiple illumination portions each independently illuminating one of multiple areas rearward of the vehicle;
   capturing, using a camera mounted at a rear of the vehicle, images of the environment while illuminated by the at least one backup light over a predetermined time period;
   dividing each of the images into zones, wherein each zone corresponds to one of the multiple areas illuminated by the multiple illumination portions;

evaluating an environmental brightness level of individual ones of the zones by calculating, for each of the zones, an average brightness value within the respective zone over the predetermined time period;

comparing the average brightness value for each zone to an upper limit and a lower limit;

decreasing the brightness of one or more of the illumination portions when the average brightness value in the corresponding zone is greater than the upper limit;

increasing the brightness of one or more of the illumination portions when the average brightness value in the corresponding zone is less than the lower limit; and maintaining the brightness of one or more of the illumination portions when the average brightness value in the corresponding zone is between the upper limit and the lower limit.

2. The method of claim 1, further including energizing the at least one backup light only when the vehicle is in a reverse drive mode.

3. The method of claim 1, wherein the at least one backup light includes a first backup light and a second backup light and the first backup light and the second backup light are mounted on a rear facing portion of the vehicle.

4. The method of claim 1, wherein the average brightness value is based on a Brightness Histogram between 0 and 255, and the upper limit is 150 and the lower limit is 110.

5. The method of claim 1, further including continuing to modify the brightness level of the least one backup light until the at least one backup light is deactivated.

6. The method of claim 1, further including evaluating the environmental brightness level based on a Brightness Histogram.

7. A method for modifying a brightness level of at least one backup light in vehicle, the method comprising:

energizing the at least one backup light to a default brightness to illuminate an environment rearward of the vehicle when in a reverse mode, wherein the at least one backup light includes multiple illumination portions each independently illuminating one of multiple areas rearward of the vehicle, and wherein the at least one backup light includes a first backup light and a second backup light and the first backup light and the second backup light are mounted on a rear facing portion of the vehicle;

capturing, using a camera mounted at a rear of the vehicle, images of the environment while illuminated by the at least one backup light over a predetermined time period;

dividing each of the images into zones, wherein each zone corresponds to one of the multiple areas illuminated by the multiple illumination portions;

evaluating an environmental brightness level of individual ones of the zones by calculating, for each of the zones, an average brightness value within the respective zone over the predetermined time period;

comparing the average brightness value for each zone to an upper limit and a lower limit;

decreasing the brightness of one or more of the illumination portions when the average brightness value in the corresponding zone is greater than the upper limit;

increasing the brightness of one or more of the illumination portions when the average brightness value in the corresponding zone is less than the lower limit; and maintaining the brightness of one or more of the illumination portions when the average brightness value in the corresponding zone is between the upper limit and the lower limit.

8. The method of claim 7, wherein the average brightness value is based on a Brightness Histogram between 0 and 255, and the upper limit is 150 and the lower limit is 110.

9. The method of claim 7, further including continuing to modify the brightness level of the least one backup light until the at least one backup light is deactivated.

10. The method of claim 7, further including evaluating the environmental brightness level based on a Brightness Histogram.

* * * * *